United States Patent [19]

Okabe et al.

[11] Patent Number: 4,634,828
[45] Date of Patent: Jan. 6, 1987

[54] CONTROL METHOD OF RESISTANCE WELDING

[75] Inventors: Yoshio Okabe; Masato Furudate, both of Kanagawa, Japan

[73] Assignee: Dengensha Manufacturing Company Limited, Kanagawa, Japan

[21] Appl. No.: 778,467

[22] Filed: Sep. 20, 1985

[30] Foreign Application Priority Data

Sep. 21, 1984 [JP] Japan ................. 59-199250

[51] Int. Cl.⁴ ............................................ B23K 11/24
[52] U.S. Cl. ................................ 219/117.1; 219/91.1; 219/110
[58] Field of Search ............. 219/110, 109, 117.1, 219/91.1

[56] References Cited
FOREIGN PATENT DOCUMENTS 58-35086  3/1983  Japan ................................. 219/110
2122935  1/1984  United Kingdom ............... 219/110

Primary Examiner—Clifford C. Shaw
Attorney, Agent, or Firm—Sughrue, Mion, Zinn, Macpeak & Seas

[57] ABSTRACT

A control method of resistance welding for controlling weld conditions, such as welding current and welding time, in response to a change in material of weldments, which comprises the steps of detecting the local lowest value of resistance between electrode tips appearing in an initial welding period, comparing the detected lowest value with a plurality of reference resistance values preset correspondingly to materials of weldments of different sorts and divided into plural classes to determine the material of a weldment under process, and changing the weld conditions, such as welding current and welding time, depending upon the determined material.

2 Claims, 2 Drawing Figures case of welding galvanized sheet iron, the contact resistance on each contact surface of the tip and weldment decreases after termination of the initial unstable region, which remains for one to two cycles after the start of conduction as shown in FIG. 1, because the electric resistance of zinc plating is smaller than that of iron, and further decreases because the zinc plating around the weld portion melts due to conduction to expand the area of the conducting path, as a result, the resistance between the electrode tips decreases.

The present control method controls welding by discriminating the material of weldments under process through detection of a local lowest value of resistance between the electrode tips in the initial welding period during the course of welding and changing after the initial welding period the weld conditions to the best fitted ones suitable for the material discriminated.

An exemplary system for realizing the present control method will now be described with reference to the block diagram of FIG. 2. In a case where galvanized sheet iron and bare steel plate not zinc-plated are arranged in a mixed order on the production line and are to be subjected to the process of spot welding, experimental welding is performed beforehand with respect to each material of the weldments to obtain the lowest value of resistance between the electrode tips. In addition, reference values of resistance corresponding to respective materials and best fitted weld conditions relating to the respective reference values are entered in a setting unit 1 shown in FIG. 2.

In practice, the following conditions are obtained through experimentation and set in the setting unit 1:
(1) Current value and welding time before initial welding period.

It is desirable that the initial welding period extending into the initial unstable region be comparatively short. The welding current is set so as to provide a good state of touch in a short time.
(2) Current value and welding time after initial welding period.

One set of weld conditions should be created with taking into consideration the contribution of the initial welding period to welding action.
(3) Resistance values corresponding to respective materials.

Through the experiment of welding the lowest resistance value relating to each weldment in the initial welding period is obtained with respect to different extents of wear of the electrode tip 10, and reference resistance values are determined for classification of these lowest values in terms of the degree of wear. In practice, because the resistance value of galvanized sheet iron is low, the weld conditions therefor are set high. On the other hand, because the resistance value of bare steel plate is high, the weld conditions are set low. To prepare for the worst, the reference resistance value is shifted somewhat toward the value relating to a material whose weld conditions are high, so that where there is the possibility that a metal plate with a surface not plated be discriminated as galvanized sheet iron, this situation being permitted because inferior welding is avoided. In contrast, galvanized sheet iron can not be discriminated as a bare plate.

Referring to FIG. 2, in addition to a voltage between the electrode tips, a welding current is detected every half cycle by means of a toroidal coil 11, CT (current transformer) 12, etc. during the initial welding period extending over some cycles (ranging from a half cycle to ten cycles, for example), and on the basis of these detected values the resistance between the electrode tips is computed in a lowest resistance computing circuit 2 receiving these values by the following equation:

$$\text{Resistance between electrodes} = \frac{\text{Voltage between electrodes}}{\text{Welding current}}$$

Only the lowest value among others of resistance between the electrode tips obtained in the computing circuit 2 is output and applied to a comparison arithmetic circuit 3. The comparison arithmetic circuit 3 then compares the foregoing lowest value with the reference resistance values relating to materials of respective weldments and given from the setting unit 1. When the lowest value is within the range of the reference resistance value relating to a bare plate, a thyristor 13 is controlled by a phase control igniting circuit 4 responsive to a command given from the comparison arithmetic circuit 3 so that the weld conditions are changed to ones relating to the material of the weldment under process and its welding is carried out under the changed weld conditions after the initial welding period.

For reference, in FIG. 2, reference number 14 is a welding transformer, number 15 is a welding source, and number 16 is a switch for selecting the toroidal coil 11 or CT 12.

In the foregoing description the control operation of the embodiment taking place when the lowest value is within the range of some reference resistance value is explained. If the lowest value obtained comes outside any ranges preset of the reference resistance values, this situation is judged as abnormal. For such a case it is of course possible to add a function for generating a warning signal, for example, to the system.

As is apparent from the foregoing description, according to the present invention, in the process of welding various weldments of different materials arranged in a mixed order on the production line, the discrimination as to whether or not the surface of each weldment is zinc-plated is achieved through detection of the local lowest value of resistance between the electrode tips appearing in the initial welding period during the course of actual welding, and the weld conditions are automatically changed immediately upon detection to the optimum ones depending upon the obtained discrimination to continue the process of welding. Therefore, the present control method avoids the problem about of installation space of the sensor and the inconvenience of suffering troubles of damage etc., these being peculiar to the conventional optical discrimination system. Further, the present control method can provide always a high quality of welding, regardless of material of the weldments and even if these are arranged or supplied in a mixed order on a complicated production line, such as the present-day car body production line. Accordingly, the present control method prevents wear of the electrode tip at an early stage of use which tends to occur if used under heavy conditions, reduces the frequency of dressing of the electrode tip and tip exchange work, and improves the productivity of the system.

What is claimed is:

1. A control method of resistance welding for controlling weld conditions in response to a change in material of weldments, comprising the steps of

CONTROL METHOD OF RESISTANCE WELDING

BACKGROUND OF THE INVENTION

1. Field of the Invention

This invention relates to resistance welding and, more particularly, to a control method of resistance welding which discriminates the material of a weldment in an initial welding period and thereafter continues and completes welding by changing weld conditions so that they meet the requirements of the material under process.

2. Description of the Prior Art

In the present-day production line of handling car bodies by the use of a number of welding robots, for example, an increasing number of cases include a process to which various weldments of different materials, such as bare steel plate and galvanized sheet iron, are subjected in a complicated order in accordance with a specification about products. To provide a good quality of welding under such circumstances as above it is necessary to change weld conditions depending upon a change of weldment.

Hitherto, in order to judge whether or not the surface of a weldment on the multiproduct-mixed production line is plated, an optical detecting system was sometimes used which uses generally an infrared ray.

However, because an optical sensor of the foregoing conventional system is located in a narrow space close to an electrode tip, it has the disadvantages that spatters produced at the time of welding, water, oil and dust given from the external, etc. adhere easily to the surface of the sensor, the sensor tends to be damaged due to contact with weldments or clamping tools, and the same is comparatively high-priced. Thus, the known systems are not feasible.

In practice, to weld galvanized sheet iron and bare steel plate supplied in a random order, for example, the weld conditions are adjusted so as to match with one weldment, e.g. galvanized sheet iron, whose weld conditions are severer than that of the other, so that the other weldment obeys the adjusted weld conditions. As a result, the galvanized sheet iron needs a larger current than the bare steel plate, whereas the bare steel plate is welded under excessive weld conditions. After all, the present-day industry performs welding unavoidably under the weld conditions which yield no inferior welding, but a somewhat bad external appearance and a little dust.

The remaining problem is that as the welding is performed repeatedly under excessive weld conditions for a long time against the bare steel plate, wear of the electrode tip is promoted due to voluminous generation of dust, for example, and the interval of dressing of the electrode tip and tip exchange work is made shorter. From the manufactural point of view which seeks to provide a high operating ratio, these time-consuming incidental tasks raise serious problems.

SUMMARY OF THE INVENTION

It is an object of the present invention to set ideal weld conditions for each weld point of a series of weld work on the basis of discrimination of the material of a weldment at each weld point.

It is another object of the present invention to provide a control method of resistance welding applicable to a production line where a number of products of different sorts are to be spot-welded under complicated weld conditions.

It is a further object of the present invention to provide a control method of resistance welding by which the interval of dressing of an electrode tip and tip exchange is made long and the productivity of a multi-product-mixed production line is improved.

In brief, a control method of resistance spot welding according to the present invention for controlling weld conditions, such as welding current and welding time, in response to a change in material of weldment comprises the steps of detecting a local lowest value of resistance between electrode tips appearing in an initial welding period, comparing the detected lowest value with a plurality of reference resistance values preset to correspond to different weldment materials and divided into plural classes to determine the material of a weldment under process, and changing the weld conditions, such as welding current and welding time, depending upon the determined material.

DESCRIPTION OF THE PREFERRED EMBODIMENT

An embodiment of a control method according to the present invention and a system for realizing the present control method will now be described in detail with reference to the drawings.

Figure 1:
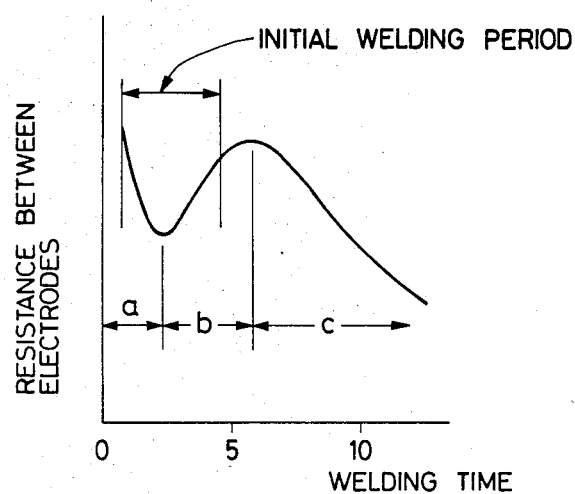
FIG. 1 is a waveform diagram showing a variation of resistance between electrode tips in the course of welding.
Figure 2:
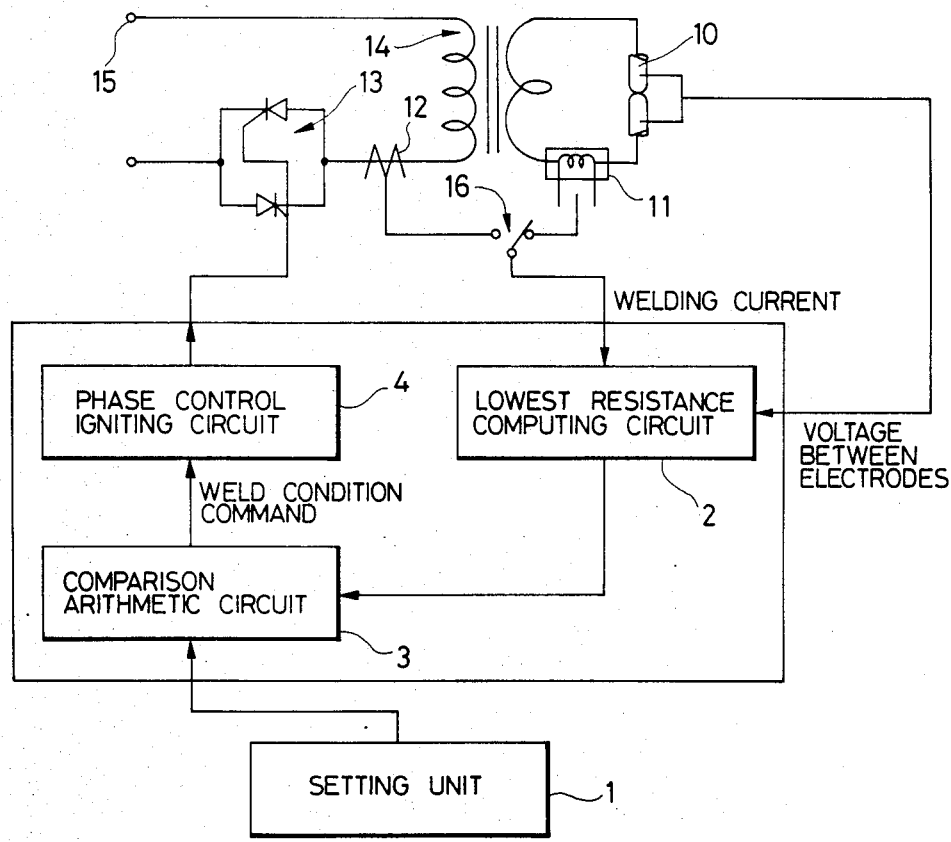
FIG. 2 is an electrical block diagram of an example of a system for realizing a control method according to the present invention.

As is well known in the art of common spot welding, the resistance between the electrode tips during the course of welding changes as shown typically in FIG. 1.

Period a indicated in this drawing is an unstable region immediately after the start of conduction or welding, during which the behavior of resistance between the electrode tips depends upon the state of touch (fit) of weldments and the condition of stains on the surface of the weldment, such as oil and rust. A surface contact resistance disappears within one to two cycles (see the horizontal axis "WELDING TIME") after the start of conduction and the resistance between the electrode tips decreases steeply.

In period b, two phenomena concurrently occur and progress: an increase of intrinsic resistance of the weldments due to temperature rise at a weld portion and an enlargement of area of a conducting path due to softening and collapsing of the weld portion. During the above progress an increase of resistance in the weld portion due to an increase in intrinsic resistance overcomes a decrease of resistance due to an enlargement of area of the conducting path. As a result, the total resistance between the electrode tips increases and assumes the maximum value at a moment close to the end of this progress or period. In this period b, a nugget appears and grows up through its initial stage.

In period c, the area of the conducting path continues to expand with a growth of the nugget, but the resistance between the electrode tips decreases because the intrinsic resistance reaches a saturation value and is kept substantially constant.

As is apparent from the variation of resistance between the electrode tips in the course of welding, in the detecting a local lowest value of resistance between electrode tips appearing in an initial welding period, comparing the lowest value detected with a plurality of preset reference resistance values which correspond to different weldment materials and which are divided into plural classes to determine the material of a weldment in progress, and changing the weld conditions depending upon the determined material.

2. The control method of resistance welding as recited in claim 1, wherein said initial welding period begins substantially at the start of said resistance welding and ends during a period where resistance between said electrode tips begins increasing.

* * * * *